United States Patent
Zhang

(10) Patent No.: US 12,399,070 B2
(45) Date of Patent: Aug. 26, 2025

(54) FLOATING THERMOMETER

(71) Applicant: SHENZHEN HAIKE INNOVATION ELECTRONICS CO., LTD., Shenzhen (CN)

(72) Inventor: Xiaoli Zhang, Shenzhen (CN)

(73) Assignee: SHENZHEN HAIKE INNOVATION ELECTRONICS CO., LTD., Shenzhen (CN)

( * ) Notice: Subject to any disclaimer, the term of this patent is extended or adjusted under 35 U.S.C. 154(b) by 645 days.

(21) Appl. No.: 17/861,835

(22) Filed: Jul. 11, 2022

(65) Prior Publication Data

US 2023/0184598 A1   Jun. 15, 2023

(30) Foreign Application Priority Data

Dec. 9, 2021 (CN) .......................... 202111500538.5

(51) Int. Cl.
 *G01K 13/02* (2021.01)
 *G01K 1/02* (2021.01)
 *G01K 1/08* (2021.01)
 *G01K 1/14* (2021.01)

(52) U.S. Cl.
 CPC ........... *G01K 13/026* (2021.01); *G01K 1/028* (2013.01); *G01K 1/08* (2013.01); *G01K 1/14* (2013.01)

(58) Field of Classification Search
 CPC ........ G01K 13/026; G01K 1/028; G01K 1/08; G01K 1/14

USPC .................................................. 374/155, 208
See application file for complete search history.

(56) References Cited

U.S. PATENT DOCUMENTS 5,169,236 A * 12/1992 Iest .......................... G01K 13/00
  374/E1.008
2022/0136907 A1 * 5/2022 Pike ......................... G01K 1/08
  374/100

FOREIGN PATENT DOCUMENTS

CN        210495209 U   *  5/2020
JP        2004281186 A  * 10/2004
WO    WO-2017166339 A1  * 10/2017

* cited by examiner

*Primary Examiner* — Mirellys Jagan

(57) ABSTRACT

A floating thermometer includes a light-transmitting suspension chamber, a control main board, a temperature measurement device, a display device and a lighting device; the temperature measurement device. The control main board is used for controlling the lighting device to emit alternately flickering seven-color light. The suspension chamber includes a mounting cover body and a mounting seat. The control main board, the temperature measurement device, the display device and the lighting device are all arranged in the suspension chamber. The mounting cover body is hermetically covered at the first mounting opening, so that the suspension chamber can be suspended on liquid; the temperature measurement device is arranged on a lower side of the mounting seat; a lower side of the mounting seat and the temperature measurement device are put into the liquid; and the display device is used for displaying temperature value of the liquid.

9 Claims, 15 Drawing Sheets

FLOATING THERMOMETER

CROSS-REFERENCE TO RELATED APPLICATIONS

The application claims priority benefit of Chinese patent application No. 202111500538.5, filed on Dec. 9, 2021, in China National Intellectual Property Administration, and the entire contents of which are incorporated herein by reference.

TECHNICAL FIELD

The present disclosure relates to the field of thermometers, in particular to a floating thermometer.

BACKGROUND

With the development of the society, people have higher requirements for living standards, and more people pursue higher quality of life. For example, people are looking for better thermometers that measure temperatures of liquids. A thermometer is a tool that can accurately determine and measure a temperature. Thermometers are divided into pointer thermometers and digital thermometers. Various thermometers have been developed according to different uses. Thermometers for measuring water temperatures are widely used in swimming pools, rivers, wells, fish ponds, oceans, etc. The measurement range is generally between minus 40° C. to 125° C. At present, the existing thermometers on the market, an animal float floats on water, and a thermometer connected to the animal float sinks in the water. It is difficult to read a thermometer when the thermometer is used at night.

SUMMARY

The present disclosure provides a floating thermometer. A user can still read a reading on the thermometer easily, accurately and quickly when the thermometer is used at night; and furthermore, the thermometer can emit brilliant light and also achieve a water surface decorating effect.

A floating thermometer includes a light-transmitting suspension chamber, a control main board, a temperature measurement device, a display device and a lighting device, wherein the temperature measurement device, the display device and the lighting device are all electrically connected to the control main board; the control main board is used for controlling the lighting device to emit alternately flickering seven-color light including red light, orange light, yellow light, green light, cyan light, blue light and purple light; the suspension chamber includes a mounting cover body and a mounting seat; an upper side of the mounting seat has a first mounting opening; the control main board, the temperature measurement device, the display device and the lighting device are all arranged in the suspension chamber through the first mounting opening; the mounting cover body is hermetically covered at the first mounting opening, so that the suspension chamber can be suspended on liquid; the temperature measurement device is arranged on a lower side of the mounting seat; a lower side of the mounting seat and the temperature measurement device are put into the liquid, so that the temperature measurement device can measure a temperature value of the liquid; and the display device is used for displaying the temperature value of the liquid.

In one embodiment, the floating thermometer further includes a power storage module and a solar panel, wherein the power storage module and the solar panel are both electrically connected to the control main board; and the power storage module and the solar panel are both arranged in the suspension chamber through the first mounting opening.

In one embodiment, the lighting device is arranged on a lower side of the control main board; and a light-emitting surface of the lighting device is disposed towards the lower side of the mounting seat.

In one embodiment, an upper side of the control main board is also provided with a liquid crystal display (LCD) screen backlight; and a light-emitting surface of the LCD screen backlight is disposed towards the display device.

In one embodiment, the floating thermometer further includes a counterweight assembly, wherein a cross section of the mounting seat is in a stair shape with a narrow upper part and a wide lower part, so as to form the first mounting opening in the upper side and an accommodating slot in the lower side; and the counterweight assembly and the temperature measurement device are both arranged in the accommodating slot.

In one embodiment, the counterweight assembly has an interpenetrating port; and a probe of the temperature measurement device interpenetrates into the interpenetrating port.

In one embodiment, the control main board is connected to the mounting cover body through a first connector.

In one embodiment, the display device comprises a display screen and a display screen support; the control main board is also provided with a first insertion port and a second insertion port; the display screen support is inserted into the first insertion port; the display screen is connected to the display screen support; and the display screen has a pin which is inserted into the second port to electrically connect the display screen to the control main board.

In one embodiment, a first stop edge is arranged on the display device; one end of the solar panel is connected with the mounting cover body through a second connector; and the first stop edge presses the other end of the solar panel to the mounting cover body.

In one embodiment, a second stop edge and a third stop edge are arranged on the mounting cover body; the second connector presses one end of the solar panel to the second stop edge; and the first stop edge presses the other end of the solar panel to the third stop edge.

By the above-mentioned structure, since the floating thermometer includes a light-transmitting suspension chamber, a control main board, a temperature measurement device, a display device and a lighting device, the temperature measurement device, the display device and the lighting device are all electrically connected to the control main board. The control main board is used for controlling the lighting device to emit alternately flickering seven-color light including red light, orange light, yellow light, green light, cyan light, blue light and purple light; the suspension chamber includes a mounting cover body and a mounting seat; an upper side of the mounting seat has a first mounting opening; the control main board, the temperature measurement device, the display device and the lighting device are all arranged in the suspension chamber through the first mounting opening; the mounting cover body is hermetically covered at the first mounting opening, so that the suspension chamber can be suspended on liquid; the temperature measurement device is arranged on a lower side of the mounting seat; a lower side of the mounting seat and the temperature measurement device are put into the liquid, so that the temperature measurement device can measure a temperature value of the liquid; and the display device is used for displaying the temperature value of the liquid. Therefore, a user can measure the temperature value of the liquid with the temperature measurement device. Furthermore, the alternately flickering seven-color light including red light, orange light, yellow light, green light, cyan light, blue light and purple light and emitted by the lighting device can be mapped to a water surface to achieve a water surface decorating effect. In addition, the display device can display the temperature value of the liquid tested by the temperature measurement device, so that the user can read the temperature value of the liquid at the current measured position from the display device easily, accurately and quickly. Further, the user can also quickly find the position of the thermometer by means of the light mapped on the water, so that the user associates the read temperature value to a measured position on a one-to-one correspondence basis to achieve accurate, real-time and on-site measurement. Much further, the mounting cover body is hermetically covered at the first mounting opening to suspend the suspension chamber on the liquid, thus preventing the liquid from entering the suspension chamber, avoiding the liquid from corroding the control main board, the temperature measurement device, the display device and the lighting device which are arranged in the suspension chamber, and greatly improving the service life and the safety of the floating thermometer.

DETAILED DESCRIPTION OF THE EMBODIMENTS

Figure 1:
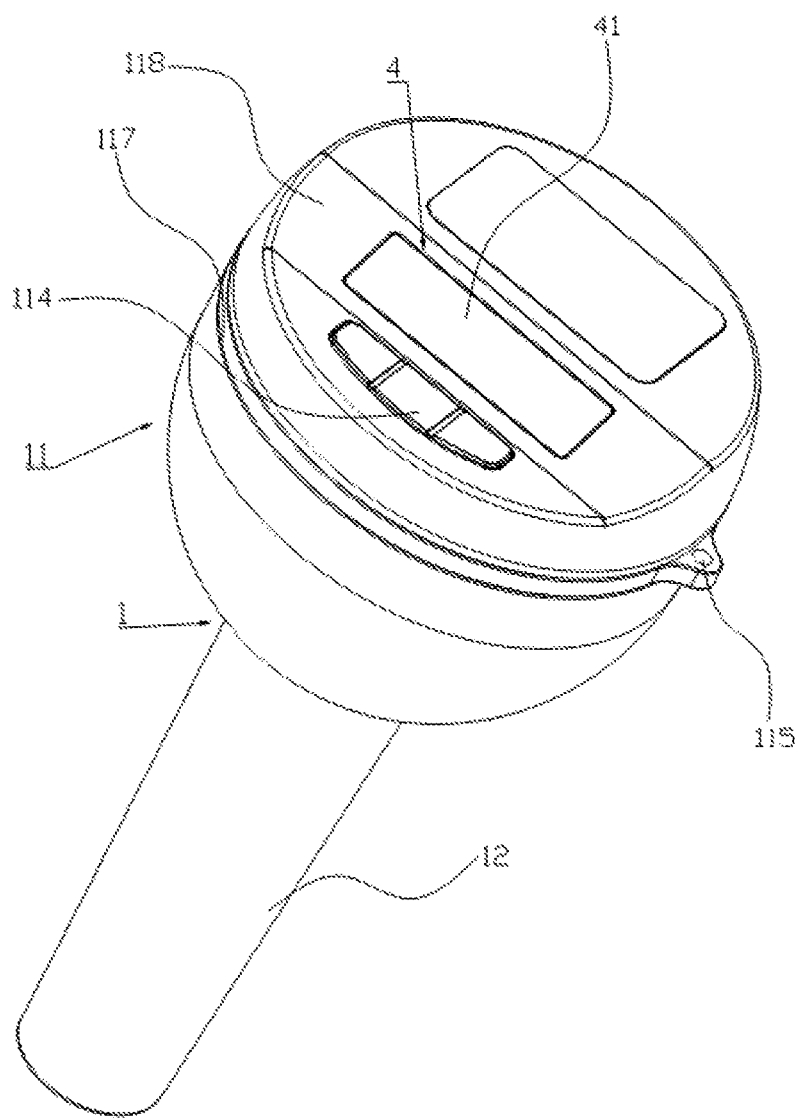
FIG. 1 is a schematic diagram of a structure of the present disclosure.
Figure 2:
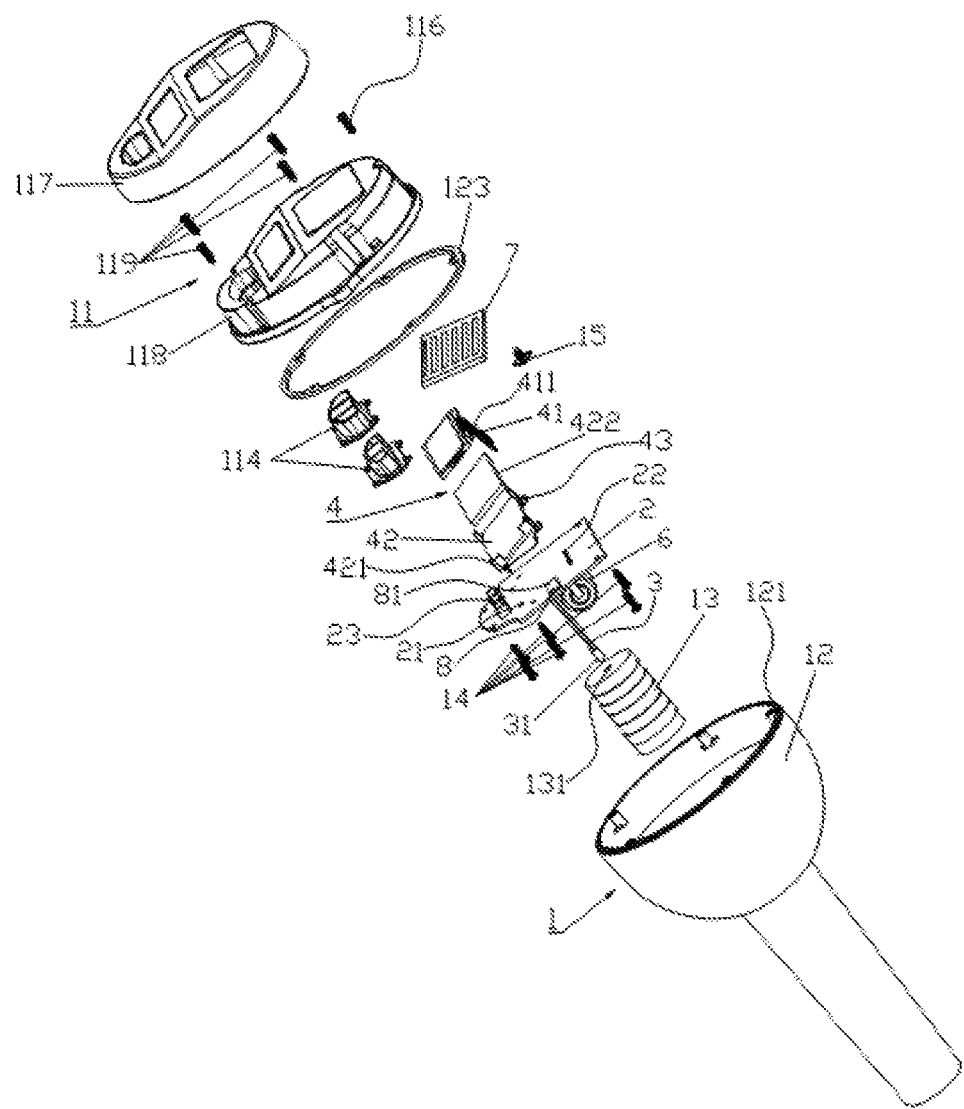
FIG. 2 is an exploded diagram of the structure shown in FIG. 1 of the present disclosure.
Figure 3:
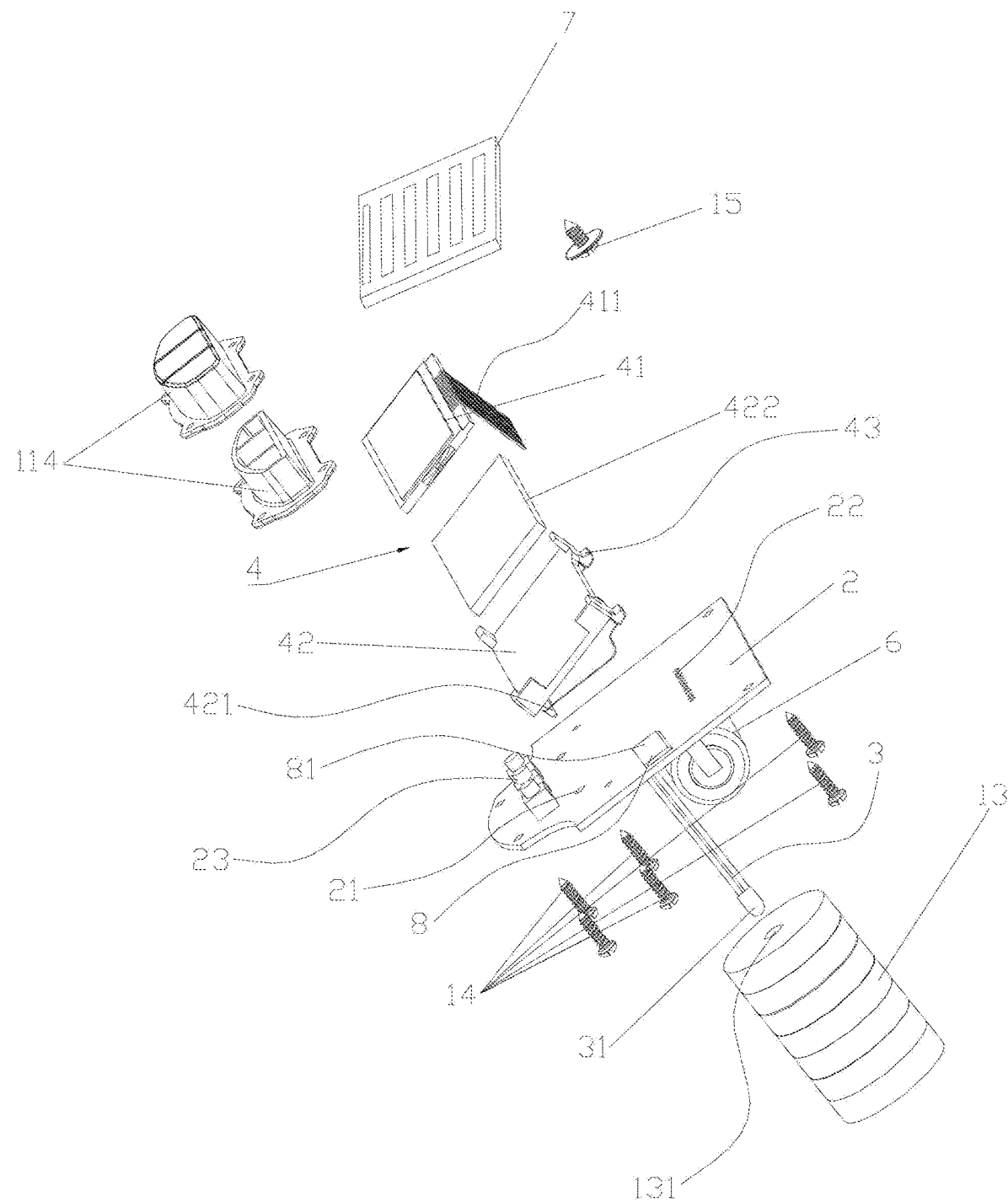
FIG. 3 is another exploded diagram of the structure shown in FIG. 1 of the present disclosure.
Figure 4:
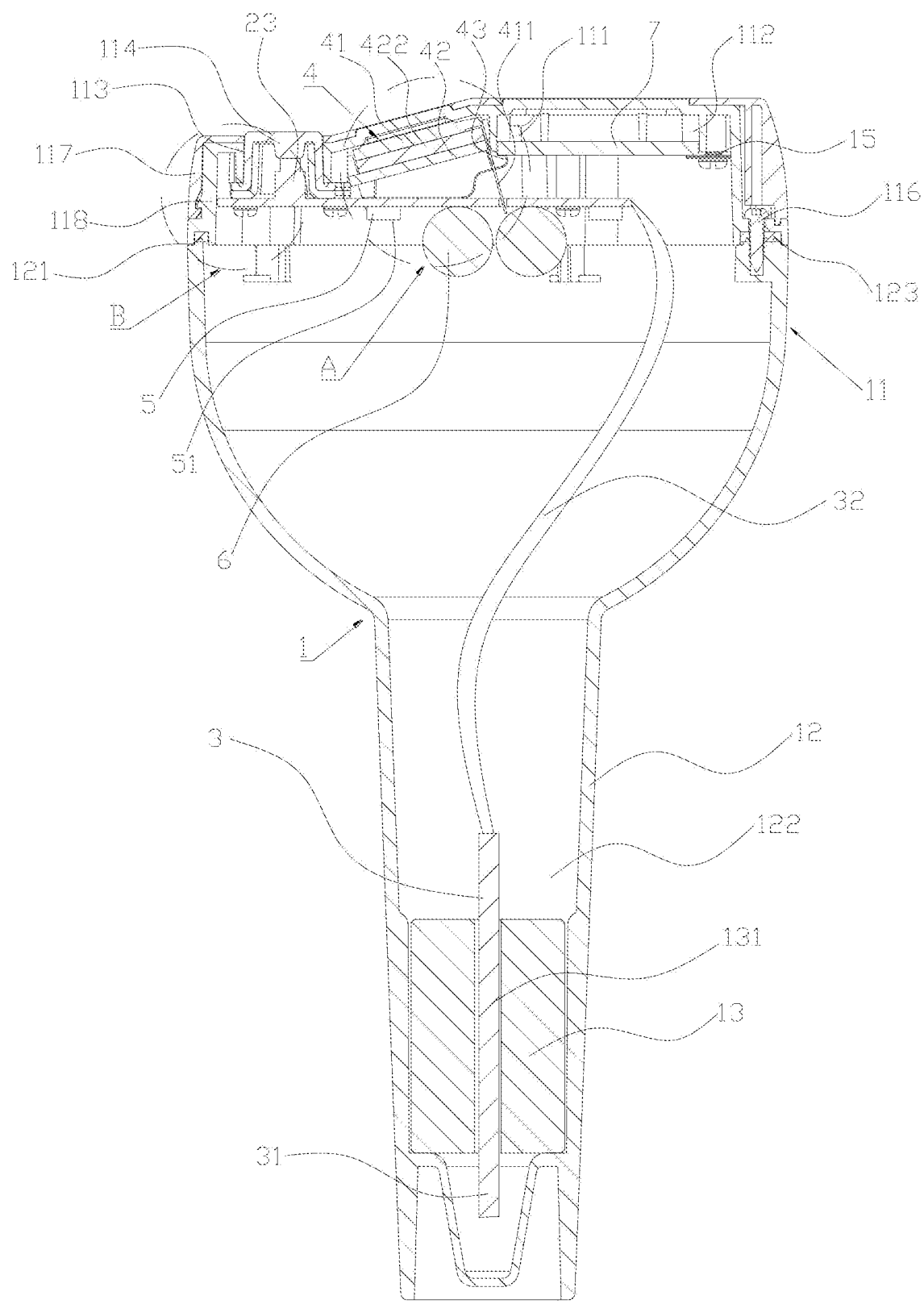
FIG. 4 is a sectional view of sectioning along a temperature measurement device.
Figure 5:
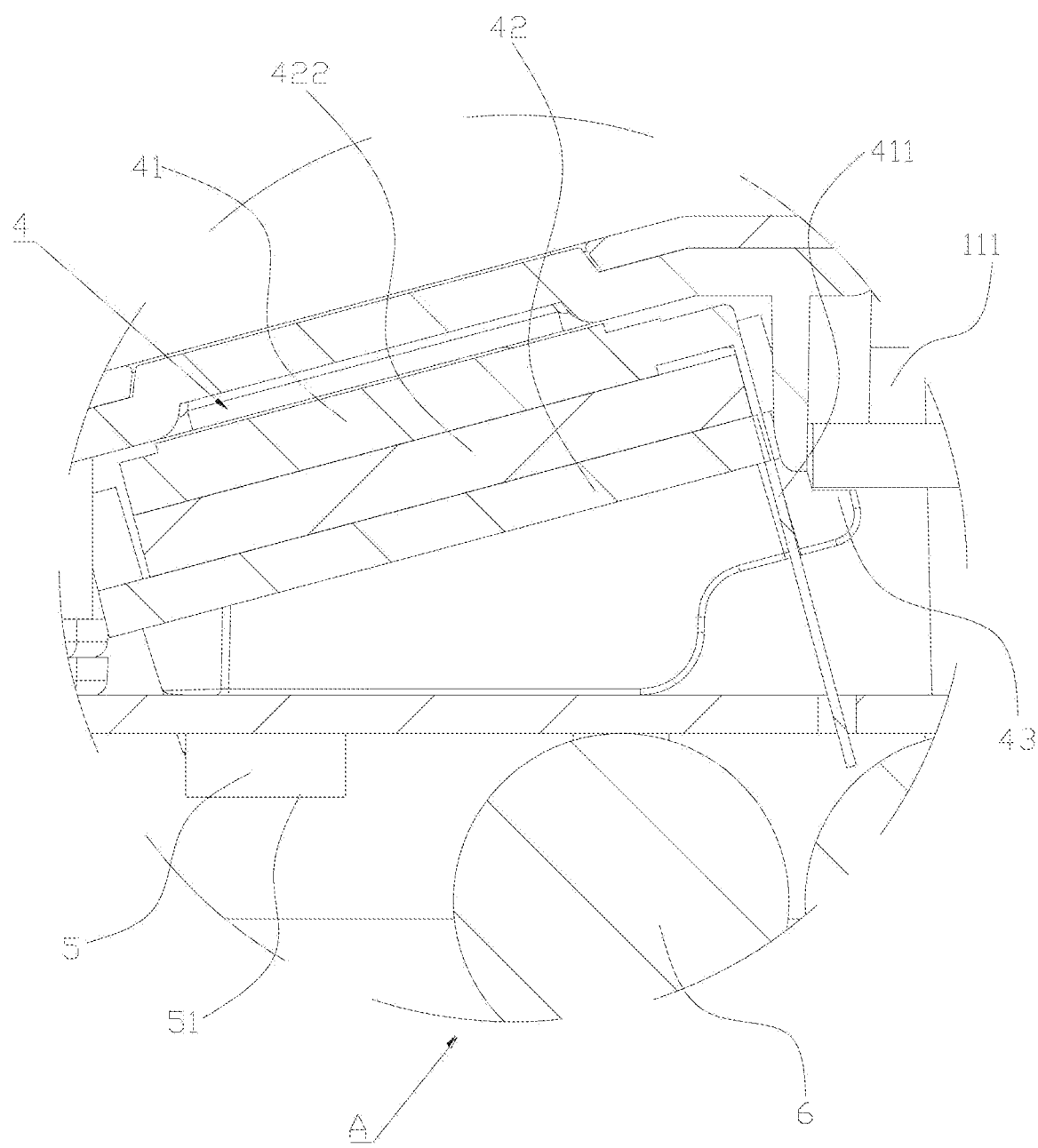
FIG. 5 is an enlarged diagram of portions labeled A of FIG. 4.
Figure 6:
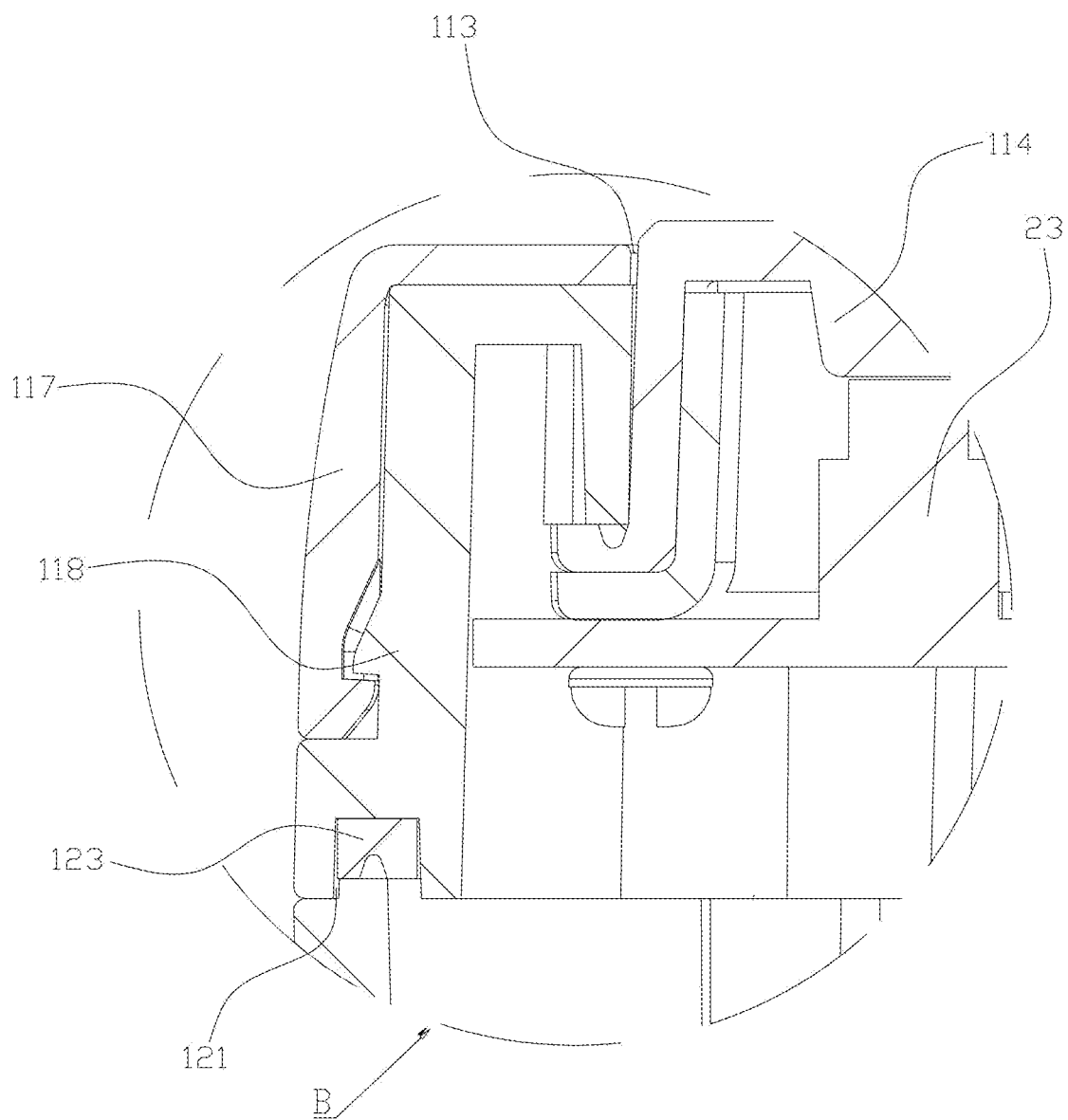
FIG. 6 is an enlarged diagram of portions labeled B of FIG. 4.
Figure 7:
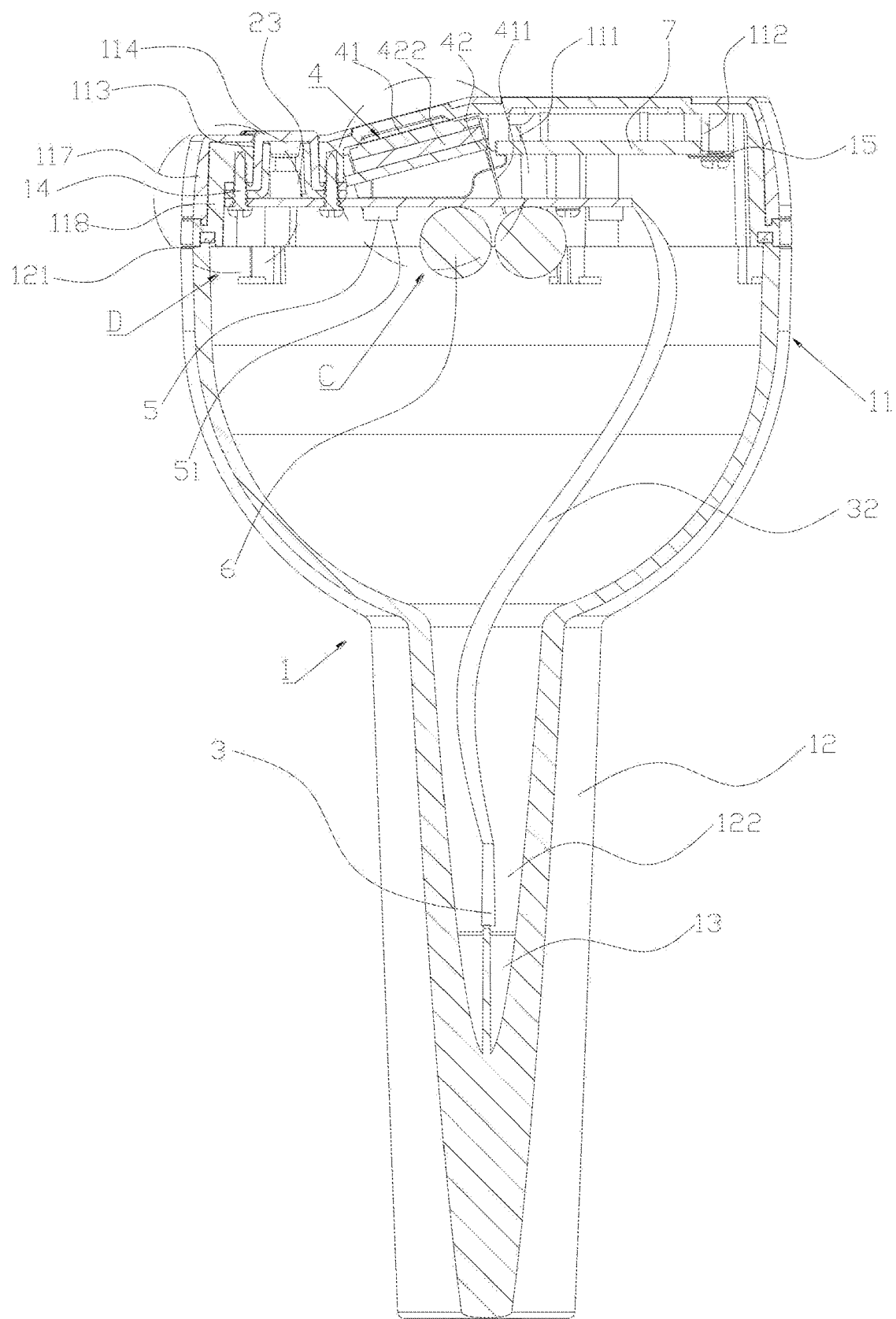
FIG. 7 is a sectional view of sectioning along a first connector.
Figure 8:
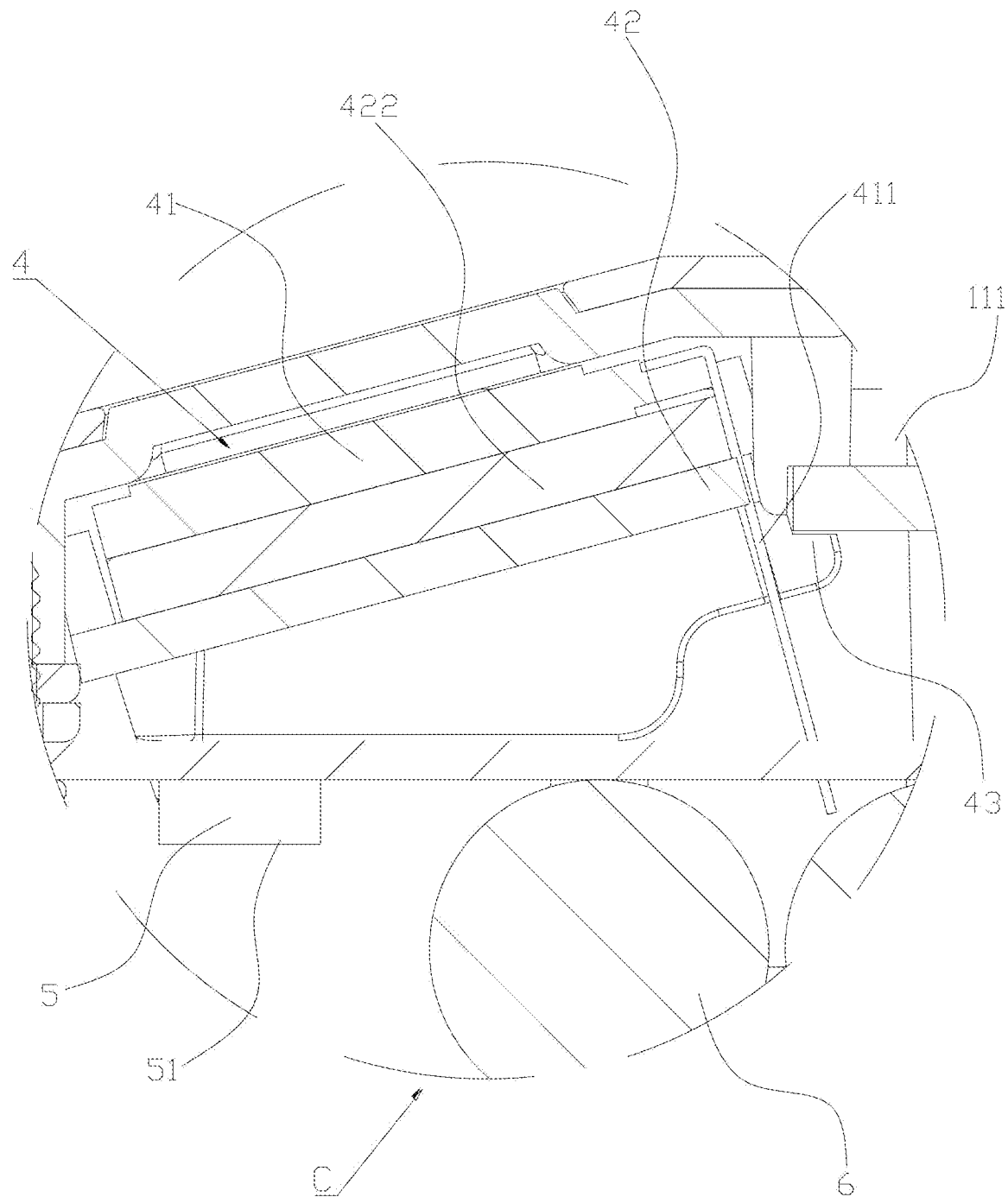
FIG. 8 is an enlarged diagram of portions labeled C of FIG. 7.
Figure 9:
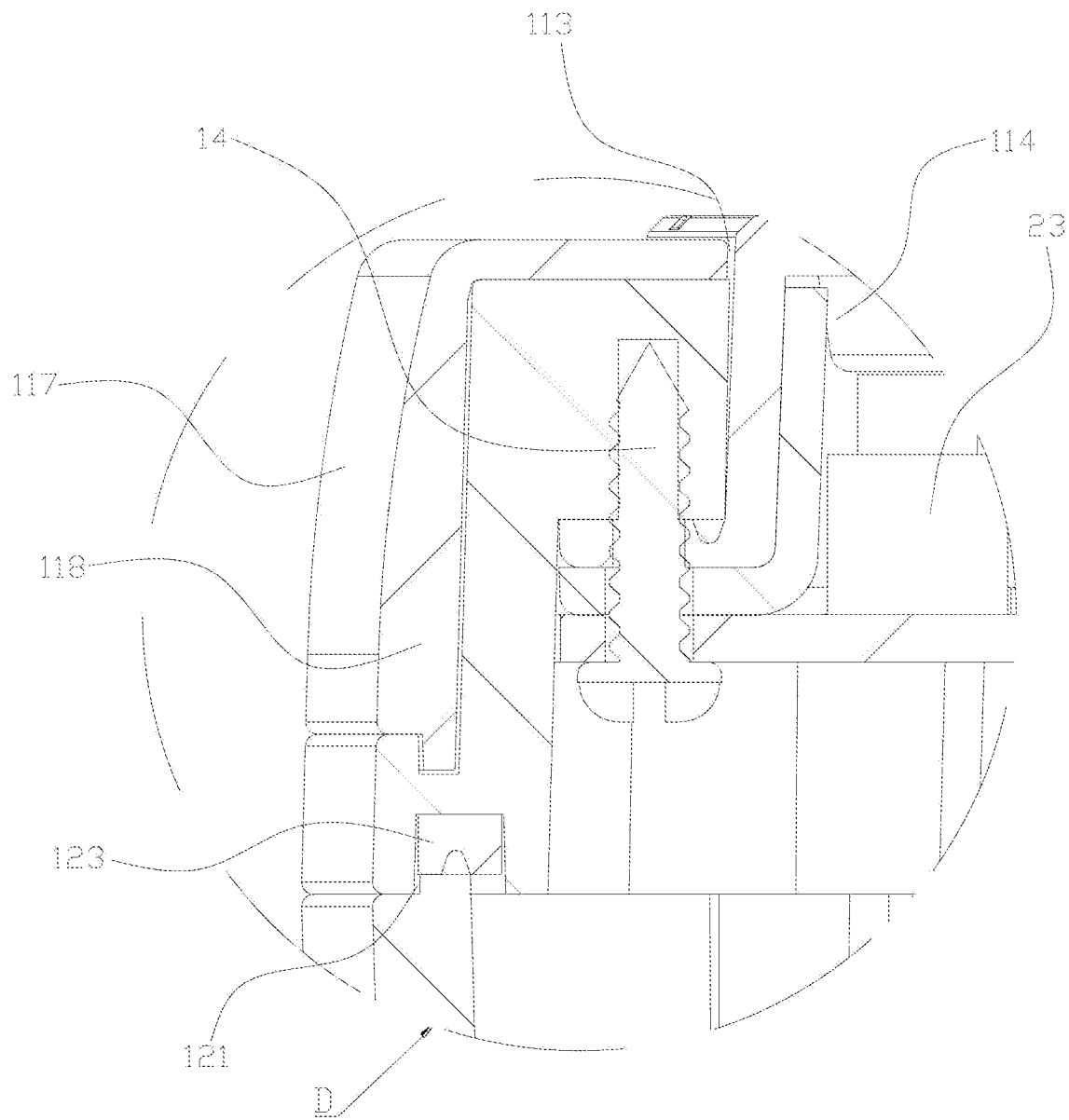
FIG. 9 is an enlarged diagram of portions labeled D of FIG. 7.
Figure 10:
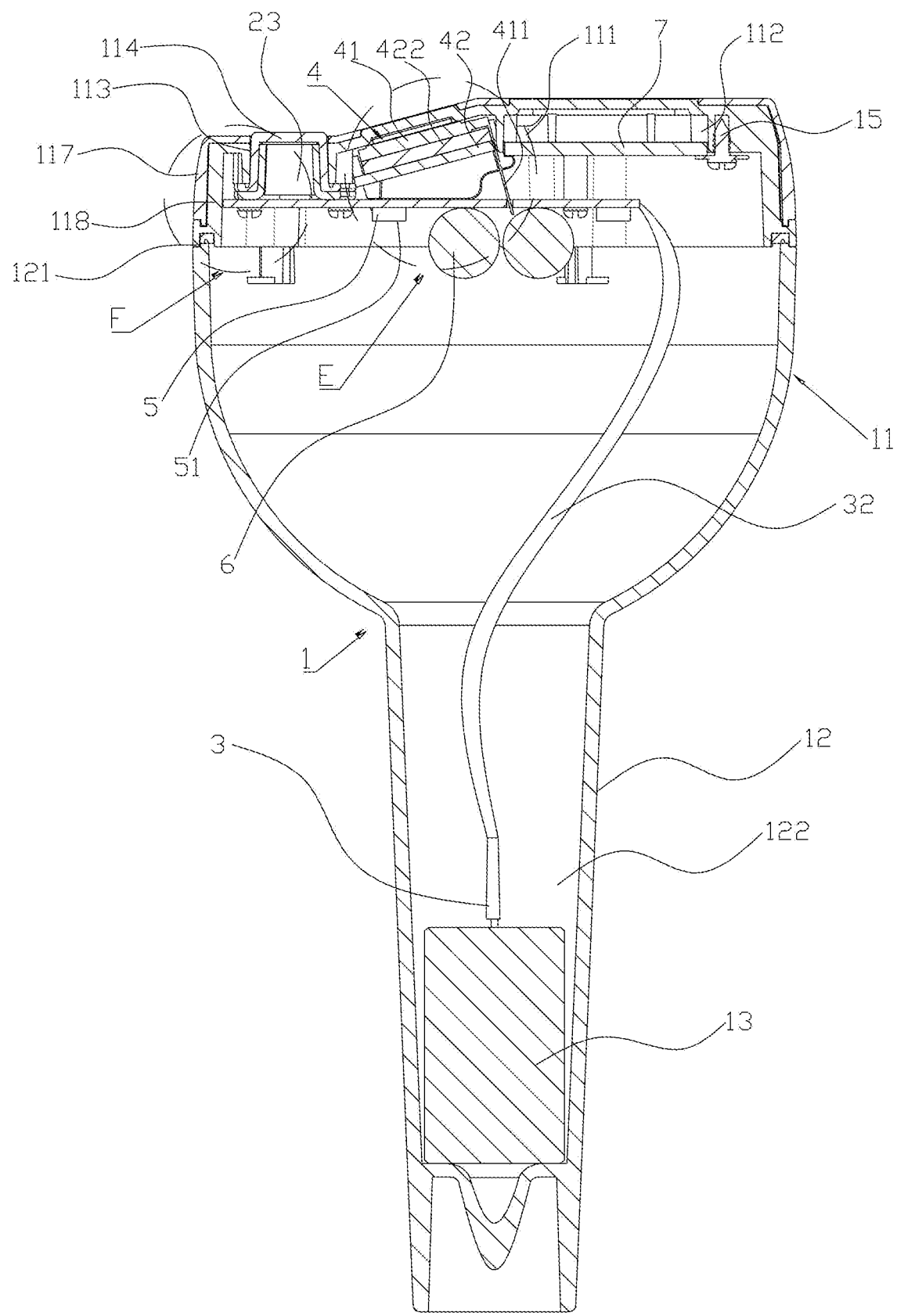
FIG. 10 is a sectional view of sectioning along a second connector.
Figure 11:
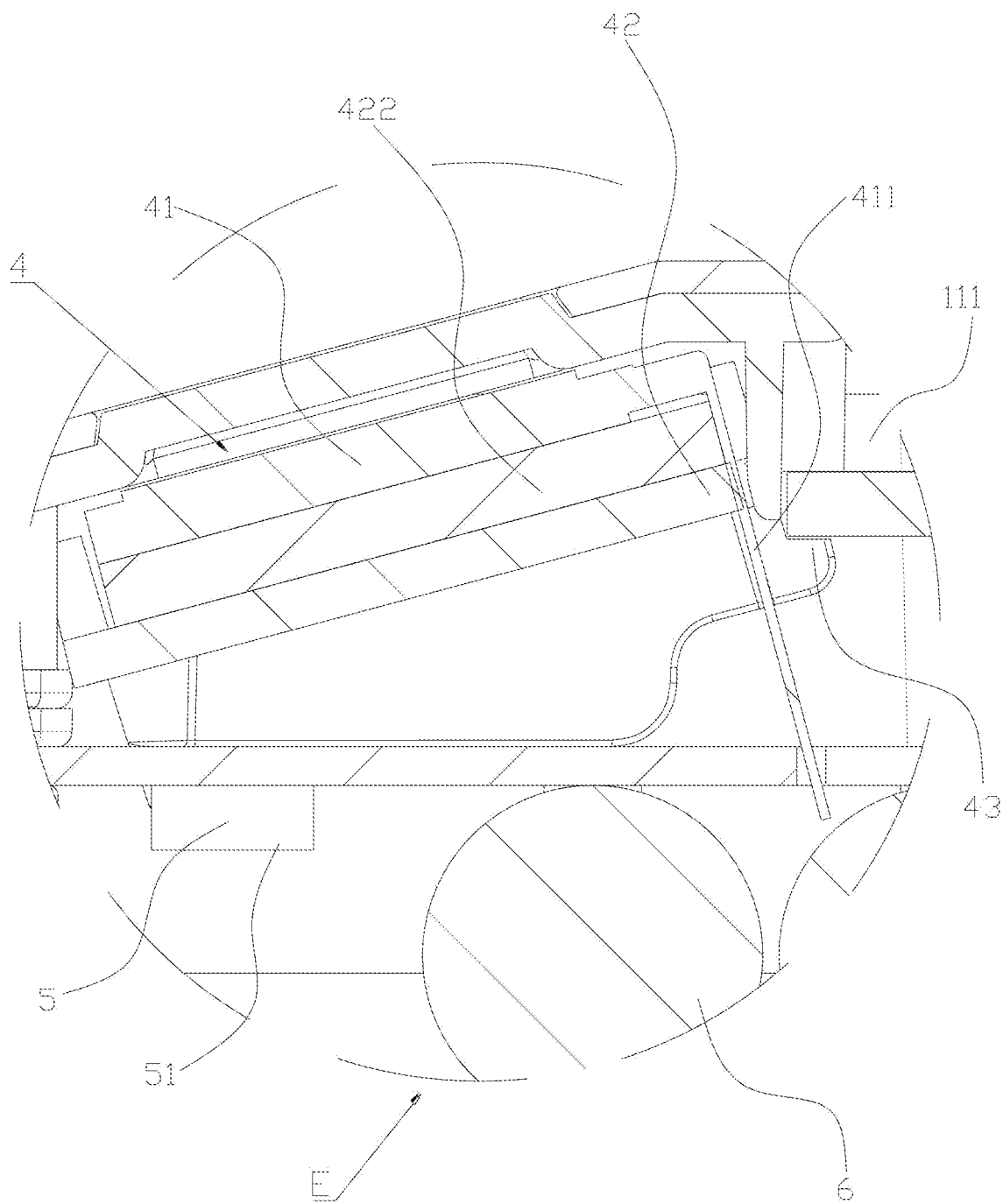
FIG. 11 is an enlarged diagram of portions labeled E of FIG. 10.
Figure 12:
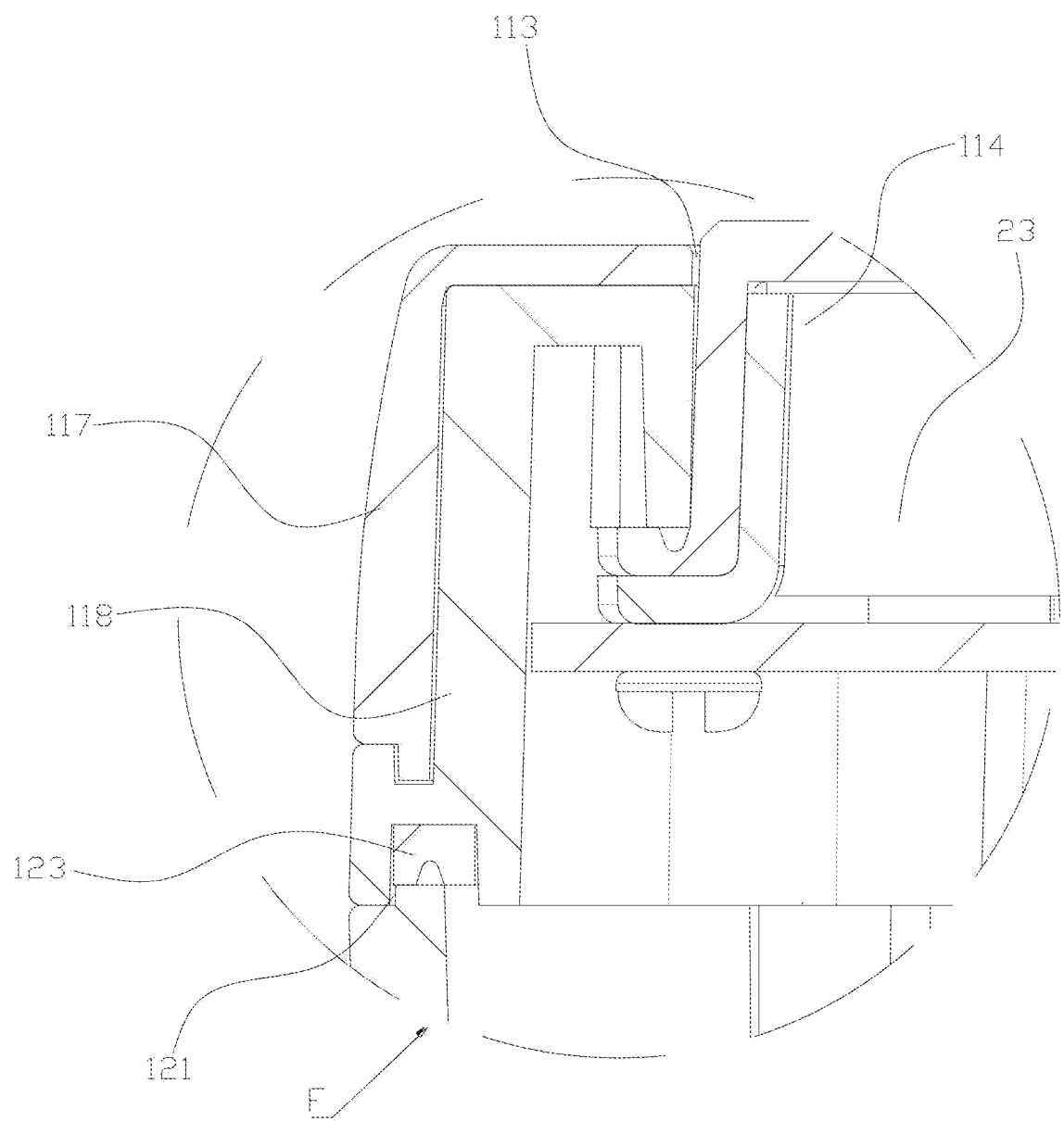
FIG. 12 is an enlarged diagram of portions labeled F of FIG. 10.
Figure 13:
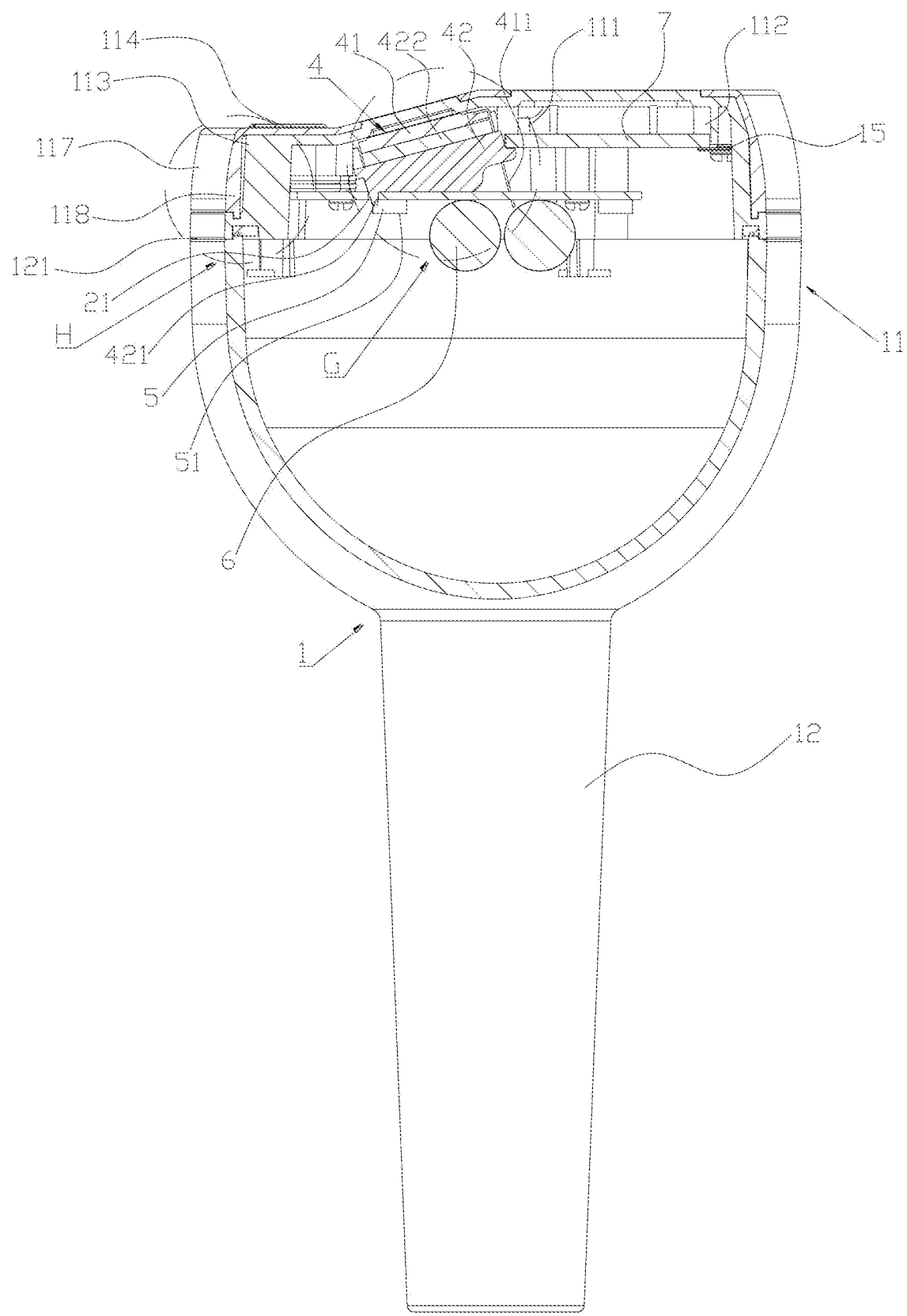
FIG. 13 is a sectional view of sectioning along a display device.
Figure 14:
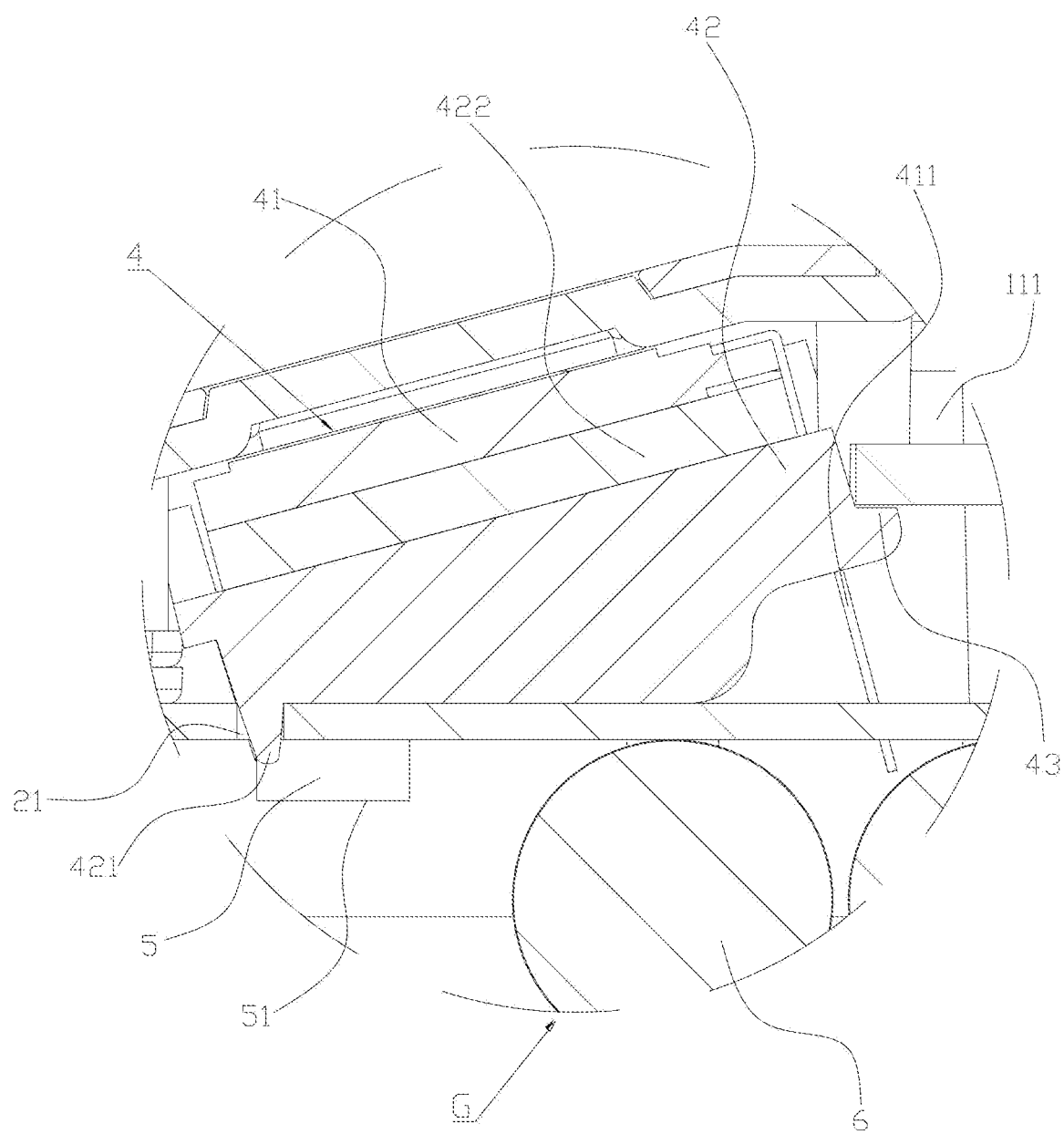
FIG. 14 is an enlarged diagram of portions labeled G of FIG. 13.
Figure 15:
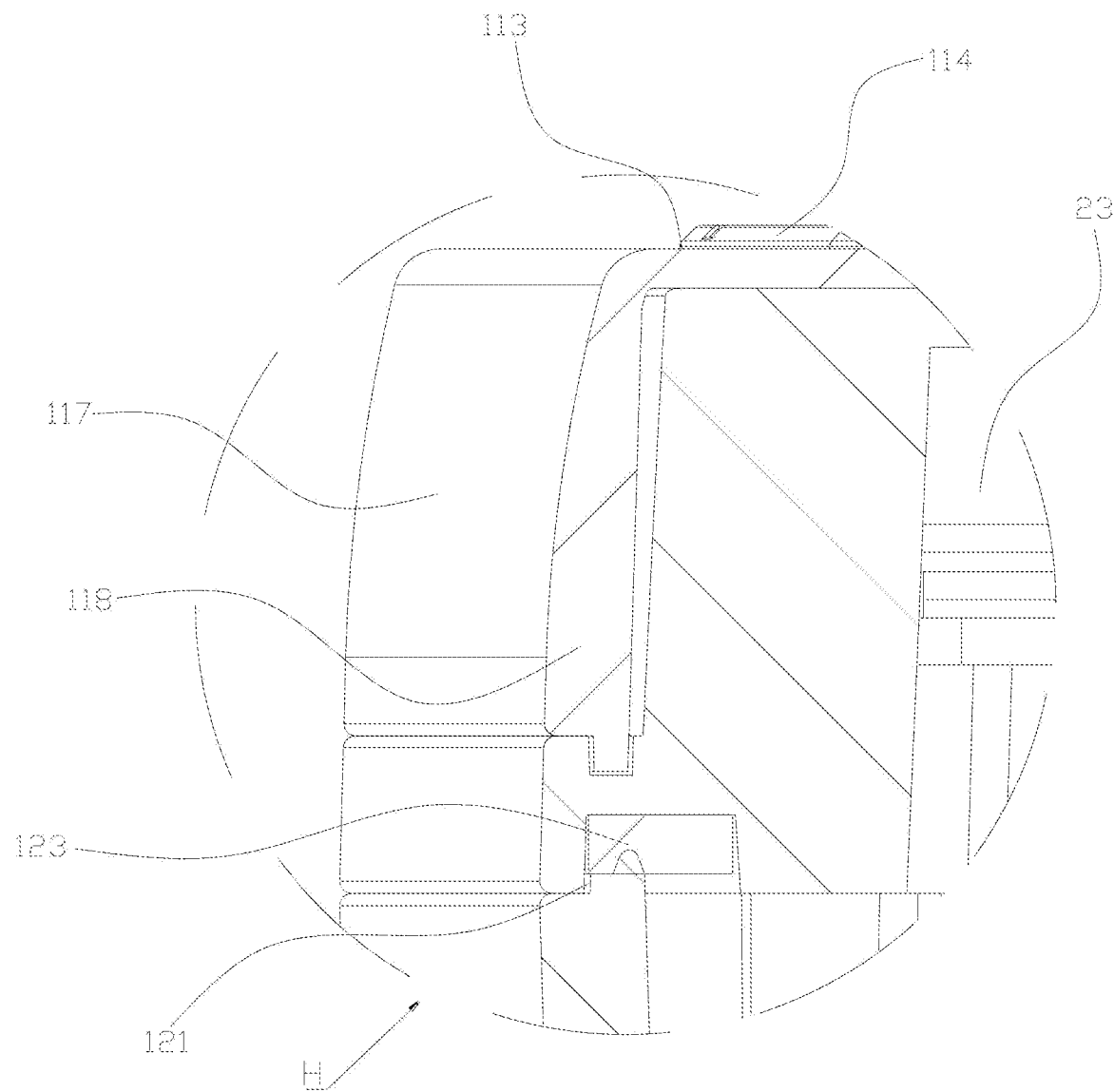
FIG. 15 is an enlarged diagram of portions labeled H of FIG. 13.

Referring to FIG. 1 to FIG. 15, a floating thermometer includes a light-transmitting suspension chamber 1, a control main board 2, a temperature measurement device 3, a display device 4 and a lighting device 5; the temperature measurement device 3, the display device 4 and the lighting device 5 are all electrically connected to the control main board 2; the control main board 2 is used for controlling the lighting device 5 to emit alternately flickering seven-color light including red light, orange light, yellow light, green light, cyan light, blue light and purple light; the suspension chamber 1 includes a mounting cover body 11 and a mounting seat 12; an upper side of the mounting seat 12 has a first mounting opening 121; the control main board 2, the temperature measurement device 3, the display device 4 and the lighting device 5 are all arranged in the suspension chamber 1 through the first mounting opening 121; the mounting cover body 11 is hermetically covered at the first mounting opening 121, so that the suspension chamber 1 can be suspended on liquid; the temperature measurement device 3 is arranged on a lower side of the mounting seat 12; a lower side of the mounting seat 12 and the temperature measurement device 3 are put into the liquid, so that the temperature measurement device 3 can measure a temperature value of the liquid; and the display device 4 is used for displaying the temperature value of the liquid.

By the above-mentioned structure, since the floating thermometer includes a light-transmitting suspension chamber, a control main board, a temperature measurement device, a display device and a lighting device, the temperature measurement device, the display device and the lighting device are all electrically connected to the control main board. The control main board is used for controlling the lighting device to emit alternately flickering seven-color light including red light, orange light, yellow light, green light, cyan light, blue light and purple light; the suspension chamber includes a mounting cover body and a mounting seat; an upper side of the mounting seat has a first mounting opening; the control main board, the temperature measurement device, the display device and the lighting device are all arranged in the suspension chamber through the first mounting opening; the mounting cover body is hermetically covered at the first mounting opening, so that the suspension chamber can be suspended on liquid; the temperature measurement device is arranged on a lower side of the mounting seat; a lower side of the mounting seat and the temperature measurement device are put into the liquid, so that the temperature measurement device can measure a temperature value of the liquid; and the display device is used for displaying the temperature value of the liquid. Therefore, a user can measure the temperature value of the liquid with the temperature measurement device. Furthermore, the alternately flickering seven-color light including red light, orange light, yellow light, green light, cyan light, blue light and purple light and emitted by the lighting device can be mapped to a water surface to achieve a water surface decorating effect. In addition, the display device can display the temperature value of the liquid tested by the temperature measurement device, so that the user can read the temperature value of the liquid at the current measured position from the display device easily, accurately and quickly. Further, the user can also quickly find the position of the thermometer by means of the light mapped on the water, so that the user associates the read temperature value to a measured position on a one-to-one correspondence basis to achieve accurate, real-time and on-site measurement. Much further, the mounting cover body is hermetically covered at the first mounting opening to suspend the suspension chamber on the liquid, thus preventing the liquid from entering the suspension chamber, avoiding the liquid from corroding the control main board, the temperature measurement device, the display device and the lighting device which are arranged in the suspension chamber, and greatly improving the service life and the safety of the floating thermometer.

The temperature measurement device is electrically connected to the control main board through an electric lead 32.

In this embodiment, the floating thermometer also includes a power storage module 6 and a solar panel 7. The power storage module 6 and the solar panel 7 are both electrically connected to the control main board 2; and the power storage module 6 and the solar panel 7 are both arranged in the suspension chamber 1 through the first mounting opening 121. By the above-mentioned structure, solar energy can be provided through the solar panel. The solar panel converts collected light energy into electric energy and stores the electric energy in a storage battery, so as to supply power to the control main board, the temperature measurement device, the display device and the lighting device, so that this structure is environmentally friendly, and operations of a user for charging the floating thermometer and replacing a battery of the floating thermometer are eliminated; the convenience of temperature measurement is greatly improved; and the service life of the floating thermometer is prolonged.

The lighting device 5 is arranged on a lower side of the control main board 2; and a light-emitting surface 51 of the lighting device 5 is disposed towards the lower side of the mounting seat 12. Specifically, the lighting device may be a light-emitting diode (LED) lamp, or may be other lighting devices with a lighting function. By the above-mentioned structure, since the light-emitting surface of the lighting device is disposed towards the lower side of the mounting seat, when the lower side of the mounting seat is put into the liquid, the alternately flickering seven-color light including red light, orange light, yellow light, green light, cyan light, blue light and purple light and emitted by the lighting device can be combined with the liquid to show a surprising and wonderful visual effect. Therefore, the floating thermometer also achieves a water surface decorating effect besides the temperature measurement function, which greatly improves the ornamental value of the floating thermometer. Furthermore, with the continuously flickering light, the user can conveniently quickly find out the position of the thermometer, and conveniently associate the read temperature value to the measured position to achieve accurate, real-time and on-site measurement.

In this embodiment, an upper side of the control main board 2 is also provided with an LCD screen backlight 8; and a light-emitting surface 81 of the LCD screen backlight 8 is disposed towards the display device 4. By the above-mentioned structure, light emitted by the LCD screen backlight turns on pixels on the display device, so that the temperature value of the liquid can also be clearly displayed under an environment with strong environmental light, and a user can observe a change in the temperature value of the liquid accurately and in real time.

In this embodiment, the floating thermometer also includes a counterweight assembly 13. A cross section of the mounting seat 12 is in a stair shape with a narrow upper part and a wide lower part, so as to form the first mounting opening 121 in the upper side and an accommodating slot 122 in the lower side; and the counterweight assembly 13 and the temperature measurement device 3 are both arranged in the accommodating slot 122. The counterweight assembly 13 has an interpenetrating port 131; and a probe 31 of the temperature measurement device 3 interpenetrates into the interpenetrating port 131. By the above-mentioned structure, the design is reasonable; the structure is simple; the connection is stable; mounting of the counterweight assembly and the temperature measurement device is effectively realized, and the mounting space of the accommodating slot is reasonably used; and in addition, due to the counterweight assembly arranged in the accommodating slot in the lower side of the mounting seat, it is convenient to put the lower side of the mounting seat into the liquid, so that the temperature measurement device can accurately measure the temperature of the liquid through the probe.

In this embodiment, the control main board 2 is connected to the mounting cover body 11 through a first connector 14. The display device 4 includes a display screen 41 and a display screen support 42; the control main board 2 is also provided with a first insertion port 21 and a second insertion port 22; the display screen support 42 is inserted into the first insertion port 21; the display screen 41 is connected to the display screen support 42; and the display screen 41 has a pin 411 which is inserted into the second port 22 to electrically connect the display screen 41 to the control main board 2. Specifically, a first stop edge 43 is arranged on the display device 4; one end of the solar panel 7 is connected with the mounting cover body 11 through a second connector 15; and the first stop edge 43 presses the other end of the solar panel 7 to the mounting cover body 11. Further, a second stop edge 111 and a third stop edge 112 are arranged on the mounting cover body 11; the second connector 15 presses one end of the solar panel 7 to the second stop edge 111; and the first stop edge 43 presses the other end of the solar panel 7 to the third stop edge 112. Much further, a first insertion block 421 is arranged on the display support 42. The first insertion block 421 is inserted into the first insertion port 21. By the above-mentioned structure, the design is reasonable; the structure is simple; the connection is stable; mounting among the control main board, the display device and the solar panel is effectively achieved; furthermore, the compact structure can prevent looseness of the control main board, the display device and the solar panel, which further prolongs the service life of the floating thermometer. The first connector and the second connector are screws, or may be bolts, or other connectors with a connection function. Specifically, ethyl vinyl acetate (EVA) foam 422 is arranged between the display screen and the display screen support. Due to its softness, good elasticity and good damping performance, the EVA can effectively prevent offset between the display screen and the display screen support and can also effectively prevent the display screen support from crushing the display screen, which further prolongs the service life of the floating thermometer.

In this embodiment, the mounting seat 12 also includes a sealing ring 123. When the mounting cover body 11 is hermetically covered at the first mounting opening 121, an inner side wall of the first mounting opening 121 and an outer side wall of the mounting cover body 11 squeeze the sealing ring 123, so that the sealing ring 123 squeezes and seals the mounting cover body 11 into the first mounting opening 121. By the above-mentioned structure, a structure is effectively achieved, where the mounting cover body is hermetically covered at the first mounting opening, so that the sealed suspension chamber is formed, which prevents the liquid from entering the suspension chamber to cause damage and short circuit of electronic elements such as the control main board in the suspension chamber.

The floating thermometer also includes a silica gel press 114; a button 23 is also arranged on the control main board 2; a second mounting opening 113 is arranged on the mounting cover body 11; the silica gel press 114 and the second mounting opening 113 are both located above the button 23, and the silica gel press 114 is hermetically covered at the second mounting opening 113. By the above-mentioned structure, the liquid can be effectively prevented from entering the suspension chamber via the second mounting opening, and a user can press the button through the silica gel press, so that a function of controlling and adjusting the floating thermometer by pressing the button is effectively realized. For example, the lighting device can be controlled to be turned on or turned off by pressing the button. For another example, the display device can be controlled to be turned on or turned off by pressing the button.

In this embodiment, a hanging port 115 is also arranged on the mounting cover 11. The hanging port 115 is used for hanging the floating thermometer. By means of the above structure, a user can fixedly hang the floating thermometer in a water pool and other scenarios through the hanging port 115 for facilitating the operation, and the user experience is enhanced.

In this embodiment, the mounting cover body 11 is hermetically covered at the mounting seat through a third connector 116.

In this embodiment, the mounting cover body 11 includes a first cover body 117 and a second cover body 118. The first cover body 117 is covered at the second cover body 118 through a fourth connector 119. The third connector and the fourth connector are screws, or may be bolts, or other connectors with a connection function.

What is claimed is:

1. A floating thermometer, comprising a light-transmitting suspension chamber, a control main board, a temperature measurement device, a display device, and a lighting device,
   wherein each of the temperature measurement device, the display device, and the lighting device is electrically connected to the control main board;
   the control main board controls the lighting device to emit alternately flickering seven-color lights including red light, orange light, yellow light, green light, cyan light, blue light, and purple light;
   the suspension chamber includes a mounting cover body and a mounting seat; an upper side of the mounting seat has a first mounting opening;
   each of the control main board, the temperature measurement device, the display device, and the lighting device is arranged in the suspension chamber through the first mounting opening;
   the mounting cover body is hermetically covered at the first mounting opening so that the suspension chamber is suspended on liquid; the temperature measurement device is arranged on a lower side of the mounting seat; a lower side of the mounting seat and the temperature measurement device are immersed into the liquid so that the temperature measurement device can measure a temperature value of the liquid; the display device displays the temperature value of the liquid;
   the lighting device is arranged on a lower side of the control main board; and a light-emitting surface of the lighting device is disposed towards the lower side of the mounting seat.

2. The floating thermometer according to claim 1, further comprising a power storage module and a solar panel, wherein the power storage module and the solar panel are both electrically connected to the control main board; and the power storage module and the solar panel are both arranged in the suspension chamber through the first mounting opening.

3. He floating thermometer according to claim 1, wherein an upper side of the control main board is provided with a liquid crystal display (LCD) screen backlight; and a light-emitting surface of the LCD screen backlight is disposed towards the display device.

4. The floating thermometer according to claim 1, wherein a counterweight assembly has an interpenetrating port; and a probe of the temperature measurement device interpenetrates into the interpenetrating port.

5. The floating thermometer according to claim 1, wherein the control main board is connected to the mounting cover body through a first connector.

6. The floating thermometer according to claim 1, wherein a first stop edge is arranged on the display device; one end of a solar panel is connected with the mounting cover body through a connector; and the first stop edge presses the other end of the solar panel to the mounting cover body.

7. The floating thermometer according to claim 6, wherein a second stop edge and a third stop edge are arranged on the mounting cover body; the connector presses one end of a solar panel to the third stop edge; and the first stop edge presses the other end of the solar panel to the second stop edge.

8. A floating thermometer, comprising a light-transmitting suspension chamber, a control main board, a temperature measurement device, a display device, a counterweight assembly, and a lighting device,
   wherein each of the temperature measurement device, the display device, and the lighting device is electrically connected to the control main board; the control main board controls the lighting device to emit alternately flickering seven-color lights including red light, orange light, yellow light, green light, cyan light, blue light, and purple light; the suspension chamber includes a mounting cover body and a mounting seat; an upper side of the mounting seat has a first mounting opening; each of the control main board, the temperature measurement device, the display device, and the lighting device is arranged in the suspension chamber through the first mounting opening; the mounting cover body is hermetically covered at the first mounting opening so that the suspension chamber is suspended on liquid; the temperature measurement device is arranged on a lower side of the mounting seat; a lower side of the mounting seat and the temperature measurement device are immersed into the liquid so that the temperature measurement device can measure a temperature value of the liquid; the display device displays the temperature value of the liquid;
   a cross section of the mounting seat is in a stair shape with a narrow upper part and a wide lower part, so as to form the first mounting opening in the upper side and an accommodating slot in the lower side; and the counterweight assembly and the temperature measurement device are both arranged in the accommodating slot.

9. A floating thermometer, comprising a light-transmitting suspension chamber, a control main board, a temperature measurement device, a display device, and a lighting device,
   wherein each of the temperature measurement device, the display device, and the lighting device is electrically connected to the control main board; the control main board controls the lighting device to emit alternately flickering seven-color lights including red light, orange light, yellow light, green light, cyan light, blue light, and purple light;
   the suspension chamber includes a mounting cover body and a mounting seat; an upper side of the mounting seat has a first mounting opening;

each of the control main board, the temperature measurement device,
the display device, and the lighting device is arranged in the suspension chamber through the first mounting opening; the mounting cover body is hermetically covered at the first mounting opening so that the suspension chamber is suspended on liquid;
the temperature measurement device is arranged on a lower side of the mounting seat; a lower side of the mounting seat and the temperature measurement device are immersed into the liquid, so that the temperature measurement device can measure a temperature value of the liquid; the display device displays the temperature value of the liquid;
the display device comprises a display screen and a display screen support; the control main board is further provided with a first insertion port and a second insertion port; the display screen support is inserted into the first insertion port; the display screen is connected to the display screen support; and the display screen has a pin which is inserted into the second insertion port to electrically connect the display screen to the control main board.

* * * * *